(12) United States Patent
Sarwar et al.

(10) Patent No.: US 9,112,327 B2
(45) Date of Patent: Aug. 18, 2015

(54) AUDIO/VIDEO CONNECTOR FOR AN ELECTRONIC DEVICE

(75) Inventors: Mushtaq Sarwar, San Jose, CA (US); Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 13/607,430

(22) Filed: Sep. 7, 2012

(65) Prior Publication Data

US 2013/0244491 A1 Sep. 19, 2013

Related U.S. Application Data

(60) Provisional application No. 61/565,468, filed on Nov. 30, 2011.

(51) Int. Cl.
| | |
|---|---|
| H04L 29/06 | (2006.01) |
| G06F 13/38 | (2006.01) |
| H01R 31/06 | (2006.01) |
| H01R 24/60 | (2011.01) |
| H01R 27/00 | (2006.01) |
| H01R 29/00 | (2006.01) |
| H01R 31/00 | (2006.01) |
| H01R 12/50 | (2011.01) |
| G06F 13/40 | (2006.01) |

(52) U.S. Cl.
CPC ............ *H01R 31/06* (2013.01); *G06F 13/4068* (2013.01); *H01R 23/6886* (2013.01); *H01R 24/60* (2013.01); *H01R 27/00* (2013.01); *H01R 29/00* (2013.01); *H01R 31/005* (2013.01); *H01R 31/065* (2013.01); *G06F 13/385* (2013.01); *H04L 29/06163* (2013.01)

(58) Field of Classification Search
None
See application file for complete search history.

(56) References Cited

U.S. PATENT DOCUMENTS

| | | | |
|---|---|---|---|
| 2,380,994 | A | 8/1945 | Pummill |
| 2,564,029 | A | 8/1951 | Petersen |
| 2,564,550 | A | 8/1951 | Tichenor |
| 2,792,557 | A | 5/1957 | Dowick |
| 2,892,990 | A | 6/1959 | Werndl |

(Continued)

FOREIGN PATENT DOCUMENTS

| | | |
|---|---|---|
| CN | 1397804 | 2/2003 |
| CN | 1830122 A | 9/2006 |

(Continued)

OTHER PUBLICATIONS

"An Overview of Current Display Interfaces", Nov. 2007, p. 12, http://isvpatch.external.hp.com/HPPTF2/drvlib/docs/DisplayInterfacesOverview.pdf.*

(Continued)

*Primary Examiner* — Kris Rhu
(74) *Attorney, Agent, or Firm* — Kilpatrick Townsend & Stockton LLP

(57) ABSTRACT

A receptacle connector for a electronic device includes two sets of contacts arranged in two opposing rows in a cavity. A corresponding plug connector can be inserted into the receptacle connector so as to contact both sets of contacts. The receptacle connectors includes contacts that are dedicated for DisplayPort signals and contacts that provide non-DisplayPort signals. The contacts dedicated for DisplayPort signals are only enabled if the electronic device receives a notification from a connected accessory that that the accessory supports DisplayPort capability. Otherwise these contacts are in an "open" or deactivated state.

9 Claims, 11 Drawing Sheets

(56) References Cited

U.S. PATENT DOCUMENTS

| | | |
|---|---|---|
| 3,760,335 A | 9/1973 | Roberts |
| 3,793,614 A | 2/1974 | Tachick et al. |
| 3,795,037 A | 3/1974 | Luttmer |
| 4,361,375 A | 11/1982 | Bailey et al. |
| 4,558,912 A | 12/1985 | Coller et al. |
| 4,621,882 A | 11/1986 | Krumme |
| 4,711,506 A | 12/1987 | Tanaka |
| 5,040,994 A | 8/1991 | Nakamoto et al. |
| 5,256,074 A | 10/1993 | Tan et al. |
| 5,295,843 A | 3/1994 | Davis et al. |
| 5,380,179 A | 1/1995 | Nishimura et al. |
| 5,380,225 A | 1/1995 | Inaoka |
| 5,387,110 A | 2/1995 | Kantner et al. |
| 5,413,442 A | 5/1995 | Grey |
| 5,442,243 A | 8/1995 | Bailey |
| 5,518,421 A | 5/1996 | Davis |
| 5,554,042 A | 9/1996 | Denninger |
| 5,594,284 A | 1/1997 | Hill et al. |
| 5,785,557 A | 7/1998 | Davis |
| 5,959,848 A | 9/1999 | Groves et al. |
| 5,967,723 A | 10/1999 | Duran |
| 5,967,833 A | 10/1999 | Cachina |
| 6,074,225 A | 6/2000 | Wu et al. |
| 6,086,421 A | 7/2000 | Wu et al. |
| 6,113,427 A | 9/2000 | Wu |
| 6,179,627 B1 | 1/2001 | Daly et al. |
| 6,231,396 B1 | 5/2001 | Huang |
| 6,322,394 B1 | 11/2001 | Katoh et al. |
| 6,364,699 B1 | 4/2002 | Hwang et al. |
| 6,410,857 B1 | 6/2002 | Gonya |
| 6,482,028 B2 | 11/2002 | Kumamoto et al. |
| 6,482,045 B2 | 11/2002 | Arai |
| 6,488,520 B1 | 12/2002 | Hayes et al. |
| 6,530,793 B2 | 3/2003 | Eichhorn et al. |
| 6,692,311 B1 | 2/2004 | Kamei et al. |
| 6,716,058 B2 | 4/2004 | Youn |
| 6,776,665 B2 | 8/2004 | Huang |
| 6,786,763 B2 | 9/2004 | Wu |
| 6,846,202 B1 | 1/2005 | Schmidt et al. |
| 6,869,320 B2 | 3/2005 | Haas et al. |
| 6,902,432 B2 | 6/2005 | Morikawa et al. |
| 6,948,965 B2 | 9/2005 | Kumamoto et al. |
| 6,948,983 B1 | 9/2005 | Peng |
| 6,948,984 B2 | 9/2005 | Chen et al. |
| 6,962,510 B1 | 11/2005 | Chen et al. |
| 6,964,582 B2 | 11/2005 | Zhuang et al. |
| 6,981,887 B1 | 1/2006 | Mese et al. |
| 6,994,575 B1 | 2/2006 | Clark et al. |
| 7,021,971 B2 | 4/2006 | Chou et al. |
| 7,040,919 B2 | 5/2006 | Yao |
| 7,074,052 B1 | 7/2006 | Ni et al. |
| 7,094,086 B2 | 8/2006 | Teicher |
| 7,094,089 B2 | 8/2006 | Andre et al. |
| 7,160,125 B1 | 1/2007 | Teicher |
| 7,175,444 B2 | 2/2007 | Lang et al. |
| 7,192,313 B2 | 3/2007 | Sai |
| 7,198,522 B1 | 4/2007 | Ho et al. |
| 7,249,978 B1 | 7/2007 | Ni |
| 7,361,059 B2 | 4/2008 | Harkabi et al. |
| 7,363,947 B2 | 4/2008 | Teicher |
| 7,364,445 B1 | 4/2008 | Ni et al. |
| 7,387,539 B2 | 6/2008 | Trenne |
| 7,396,257 B2 | 7/2008 | Takahashi |
| 7,407,416 B1 | 8/2008 | Rogers et al. |
| 7,435,107 B2 | 10/2008 | Masumoto et al. |
| 7,440,286 B2 | 10/2008 | Hiew et al. |
| 7,442,091 B2 | 10/2008 | Salomon et al. |
| 7,458,825 B2 | 12/2008 | Atsmon et al. |
| 7,500,861 B2 | 3/2009 | Harkabi et al. |
| 7,537,471 B2 | 5/2009 | Teicher |
| 7,549,896 B2 | 6/2009 | Zhang et al. |
| 7,553,172 B2 | 6/2009 | Chiu et al. |
| 7,559,805 B1 | 7/2009 | Yi et al. |
| 7,572,153 B2 | 8/2009 | Trenne |
| 7,591,657 B2 | 9/2009 | Teicher |
| 7,594,827 B2 | 9/2009 | Takamoto et al. |
| 7,695,318 B1 | 4/2010 | Wang et al. |
| 7,716,400 B2 | 5/2010 | Raines |
| 7,717,717 B1 | 5/2010 | Lai |
| 7,722,409 B2 | 5/2010 | Takamoto et al. |
| 7,727,027 B2 | 6/2010 | Chiang et al. |
| 7,740,498 B1 | 6/2010 | Orsley |
| 7,841,894 B2 | 11/2010 | Gong et al. |
| 7,865,629 B1 * | 1/2011 | Tantos et al. ............ 710/11 |
| 7,872,873 B2 | 1/2011 | Hiew et al. |
| 7,892,014 B2 | 2/2011 | Amidon et al. |
| 7,918,685 B1 | 4/2011 | Kruckenberg |
| 8,007,309 B2 | 8/2011 | Fan |
| 8,062,073 B1 | 11/2011 | Szczesny et al. |
| 8,162,696 B2 | 4/2012 | Elbaz et al. |
| 8,246,388 B2 | 8/2012 | Chen et al. |
| 8,277,258 B1 | 10/2012 | Huang et al. |
| 8,282,417 B2 | 10/2012 | Xiao |
| 8,287,299 B2 | 10/2012 | Ray et al. |
| 8,342,863 B2 | 1/2013 | Kondo et al. |
| 8,461,465 B2 | 6/2013 | Golko et al. |
| 8,478,913 B2 | 7/2013 | Terlizzi et al. |
| 8,517,751 B1 | 8/2013 | Golko et al. |
| 8,517,766 B2 | 8/2013 | Golko et al. |
| 8,535,075 B1 | 9/2013 | Golko et al. |
| 8,545,269 B2 | 10/2013 | Ore-Yang |
| 8,545,275 B2 | 10/2013 | Wang et al. |
| 8,561,879 B2 | 10/2013 | Jol et al. |
| 8,573,995 B2 | 11/2013 | Golko et al. |
| 8,647,156 B2 | 2/2014 | Golko et al. |
| 8,686,600 B2 | 4/2014 | Terlizzi et al. |
| 8,688,876 B1 | 4/2014 | Fritchman et al. |
| 8,708,745 B2 | 4/2014 | Golko et al. |
| 8,762,605 B2 | 6/2014 | Terlizzi et al. |
| 8,777,666 B2 | 7/2014 | Golko et al. |
| 8,882,524 B2 | 11/2014 | Golko et al. |
| 8,911,260 B2 | 12/2014 | Golko et al. |
| 8,931,962 B2 | 1/2015 | Jol et al. |
| 8,998,632 B2 | 4/2015 | Golko et al. |
| 2001/0046809 A1 | 11/2001 | Chiran et al. |
| 2002/0081880 A1 | 6/2002 | Eichhorn et al. |
| 2003/0012677 A1 | 1/2003 | Senini |
| 2003/0016509 A1 | 1/2003 | Tsukamoto |
| 2003/0207606 A1 | 11/2003 | Ho |
| 2004/0229515 A1 | 11/2004 | Kaneda et al. |
| 2004/0259423 A1 | 12/2004 | Elbaz et al. |
| 2005/0032426 A1 | 2/2005 | Tanaka |
| 2005/0042930 A1 | 2/2005 | Harkabi et al. |
| 2005/0079738 A1 | 4/2005 | Ahn |
| 2005/0085136 A1 | 4/2005 | Zhang et al. |
| 2005/0124217 A1 | 6/2005 | Zhuang et al. |
| 2005/0124218 A1 | 6/2005 | Chen et al. |
| 2005/0124219 A1 | 6/2005 | Chen et al. |
| 2005/0202727 A1 | 9/2005 | Andre et al. |
| 2006/0019545 A1 | 1/2006 | Moriyama et al. |
| 2006/0024997 A1 | 2/2006 | Teicher |
| 2006/0040549 A1 | 2/2006 | Yao |
| 2006/0148300 A1 | 7/2006 | Huang et al. |
| 2006/0216991 A1 | 9/2006 | Boutros |
| 2006/0250764 A1 | 11/2006 | Howarth et al. |
| 2006/0289201 A1 | 12/2006 | Kim et al. |
| 2007/0010115 A1 | 1/2007 | Teicher |
| 2007/0010116 A1 | 1/2007 | Teicher |
| 2007/0037452 A1 | 2/2007 | Martin et al. |
| 2007/0049100 A1 | 3/2007 | Tsai |
| 2007/0072442 A1 | 3/2007 | DiFonzo et al. |
| 2007/0082701 A1 | 4/2007 | Seil et al. |
| 2007/0178771 A1 | 8/2007 | Goetz et al. |
| 2007/0202725 A1 | 8/2007 | Teicher |
| 2007/0243726 A1 | 10/2007 | Trenne |
| 2008/0032562 A1 | 2/2008 | McHugh et al. |
| 2008/0067248 A1 | 3/2008 | Hiew et al. |
| 2008/0090465 A1 | 4/2008 | Matsumoto et al. |
| 2008/0119076 A1 | 5/2008 | Teicher |
| 2008/0119291 A1 | 5/2008 | Takamoto et al. |
| 2008/0167828 A1 * | 7/2008 | Terlizzi et al. ............ 702/64 |
| 2008/0200069 A1 | 8/2008 | Hankey et al. |
| 2008/0274633 A1 | 11/2008 | Teicher |
| 2008/0309313 A1 | 12/2008 | Farrar et al. |

(56) References Cited

U.S. PATENT DOCUMENTS

| | | | |
|---|---|---|---|
| 2009/0004923 A1 | 1/2009 | Tang et al. | |
| 2009/0108848 A1 | 4/2009 | Lundquist et al. | |
| 2009/0117768 A1 | 5/2009 | Liao | |
| 2009/0149049 A1 | 6/2009 | Harkabi et al. | |
| 2009/0156027 A1 | 6/2009 | Chen | |
| 2009/0180243 A1 | 7/2009 | Lynch et al. | |
| 2009/0291576 A1 | 11/2009 | Johansson et al. | |
| 2010/0009575 A1 | 1/2010 | Crooijmans et al. | |
| 2010/0062656 A1 | 3/2010 | Lynch et al. | |
| 2010/0080563 A1 | 4/2010 | Difonzo et al. | |
| 2010/0087096 A1 | 4/2010 | Sloey et al. | |
| 2010/0104126 A1 | 4/2010 | Greene | |
| 2010/0118932 A1* | 5/2010 | Luo et al. | 375/240.01 |
| 2010/0171465 A1 | 7/2010 | Seal et al. | |
| 2010/0173533 A1 | 7/2010 | Yang et al. | |
| 2010/0221936 A1 | 9/2010 | Zhao et al. | |
| 2010/0248544 A1 | 9/2010 | Xu et al. | |
| 2010/0254602 A1 | 10/2010 | Yoshino | |
| 2010/0254662 A1 | 10/2010 | He et al. | |
| 2010/0262744 A1 | 10/2010 | Deva et al. | |
| 2010/0267261 A1 | 10/2010 | Lin et al. | |
| 2010/0267262 A1 | 10/2010 | Lin et al. | |
| 2011/0136381 A1 | 6/2011 | Cho | |
| 2011/0159719 A1 | 6/2011 | Takahashi et al. | |
| 2011/0201213 A1 | 8/2011 | Dabov et al. | |
| 2011/0250786 A1 | 10/2011 | Reid | |
| 2011/0263141 A1 | 10/2011 | Ko | |
| 2011/0294354 A1 | 12/2011 | Chen et al. | |
| 2011/0312200 A1 | 12/2011 | Wang et al. | |
| 2012/0028495 A1 | 2/2012 | Su et al. | |
| 2012/0149244 A1 | 6/2012 | Zheng et al. | |
| 2013/0075149 A1 | 3/2013 | Golko et al. | |
| 2013/0078869 A1 | 3/2013 | Golko et al. | |
| 2013/0089291 A1 | 4/2013 | Jol et al. | |
| 2013/0095701 A1 | 4/2013 | Golko et al. | |
| 2013/0095702 A1 | 4/2013 | Golko et al. | |
| 2013/0115821 A1 | 5/2013 | Golko et al. | |
| 2013/0117470 A1 | 5/2013 | Terlizzi et al. | |
| 2013/0122754 A1 | 5/2013 | Golko et al. | |
| 2013/0149911 A1 | 6/2013 | Golko et al. | |
| 2013/0217253 A1 | 8/2013 | Golko et al. | |
| 2013/0244489 A1* | 9/2013 | Terlizzi et al. | 439/620.01 |
| 2013/0244492 A1 | 9/2013 | Golko et al. | |
| 2013/0337698 A1 | 12/2013 | Little et al. | |
| 2014/0004741 A1 | 1/2014 | Jol et al. | |
| 2014/0057496 A1 | 2/2014 | Siahaan et al. | |
| 2014/0068933 A1 | 3/2014 | Brickner et al. | |
| 2014/0069709 A1 | 3/2014 | Schmidt et al. | |
| 2014/0073170 A1 | 3/2014 | Golko et al. | |
| 2014/0073183 A1 | 3/2014 | Golko et al. | |
| 2014/0073193 A1 | 3/2014 | SooHoo et al. | |
| 2014/0170907 A1 | 6/2014 | Golko et al. | |
| 2014/0206209 A1 | 7/2014 | Kamei et al. | |
| 2014/0294656 A1 | 10/2014 | Brickner et al. | |
| 2014/0329416 A1 | 11/2014 | Golko et al. | |
| 2015/0155657 A1 | 6/2015 | Golko et al. | |

FOREIGN PATENT DOCUMENTS

| | | | |
|---|---|---|---|
| CN | 1905286 A | | 1/2007 |
| CN | 101116227 A | | 1/2008 |
| CN | 201256225 Y | | 6/2009 |
| CN | 201402871 Y | | 2/2010 |
| CN | 201509210 U | | 6/2010 |
| CN | 101782888 A | | 7/2010 |
| CN | 101783466 A | | 7/2010 |
| CN | 201533091 U | | 7/2010 |
| DE | 196 09 571 A1 | | 11/1995 |
| DE | 20 2004 021354 U1 | | 9/2007 |
| EP | 0081372 A2 | | 6/1983 |
| EP | 1684391 A2 | | 7/2006 |
| EP | 1717910 A2 | | 11/2006 |
| EP | 2169774 A1 | | 3/2010 |
| EP | 2 373 131 A1 | | 10/2011 |
| FR | 2138961 A1 | | 1/1973 |
| JP | 2 078171 A | | 3/1990 |
| JP | H06231821 A | | 8/1994 |
| JP | H06250103 A | | 9/1994 |
| JP | 8321360 A | | 12/1996 |
| JP | 2001223057 A | | 8/2001 |
| JP | 2003-217728 | | 7/2003 |
| JP | 2004-079491 | | 3/2004 |
| JP | 2004319371 A | | 11/2004 |
| JP | 2006309771 A | | 11/2006 |
| JP | 2008041656 A | | 2/2008 |
| JP | 2008508694 A | | 3/2008 |
| JP | 2008210674 A | | 9/2008 |
| JP | 2009117128 A | | 5/2009 |
| JP | 2010067459 A | | 3/2010 |
| TW | M318831 U | | 9/2007 |
| TW | M350153 U | | 2/2009 |
| WO | 0208872 A1 | | 1/2002 |
| WO | 2004/097995 A1 | | 11/2004 |
| WO | 2005/013436 A1 | | 2/2005 |
| WO | 2005124932 A2 | | 12/2005 |
| WO | 2006/013553 A2 | | 2/2006 |
| WO | 2006/074348 A1 | | 12/2006 |
| WO | 2007090069 | | 8/2007 |
| WO | 2008/065659 A2 | | 6/2008 |
| WO | 2009/069969 A2 | | 6/2009 |
| WO | 2009/140992 A1 | | 11/2009 |
| WO | 2011043488 A1 | | 4/2011 |
| WO | 2011150403 A1 | | 12/2011 |
| WO | 2011163256 A1 | | 12/2011 |
| WO | 2012086145 A1 | | 6/2012 |
| WO | 2013070767 A1 | | 5/2013 |
| WO | 2013082175 A2 | | 6/2013 |

OTHER PUBLICATIONS

Flipper Press Release (Jun. 25, 2012) and Data Sheet: http://www.flipperusb.com/images/flipperUSB-brochure.pdf, http://www.flipperusb.com/images/flipperUSB-brochure.pdf.

International Search Report for International PCT Application No. PCT/US2011/038452, mailed on Oct. 26, 2011, 7 pages.

International Search Report and Written Opinion for International PCT Application No. PCT/US2011/041286, mailed on Oct. 20, 2011, 18 pages.

International Search Report and Written Opinion for International PCT Application No. PCT/US2011/041127, mailed on Dec. 29, 2011, 17 pages.

International Search Report and Written Opinion for International PCT Application No. PCT/US2011/041290, mailed on Nov. 21, 2011, 21 pages.

International Search Report and Written Opinion for International PCT Application No. PCT/US2012/063944, mailed Apr. 18, 2013, 23 pages.

Non-Final Office Action for U.S. Appl. No. 13/679,991, mailed Apr. 5, 2013, 19 pages.

Non-Final Office Action for U.S. Appl. No. 13/679,992, mailed Apr. 9, 2013, 18 pages.

Notice of Allowance for U.S. Appl. No. 13/679,996, mailed Apr. 12, 2013, 30 pages.

Notice of Allowance for U.S. Appl. No. 13/720,822, mailed Apr. 8, 2013, 30 pages.

Search and Examination Report for United Kingdom Patent Application No. 1220045.7, mailed on Mar. 15, 2013, 7 pages.

Partial Search Report for International PCT Application No. PCT/US2012/066881 (mailed with Invitation to Pay Fees), mailed Mar. 25, 2013, 8 pages.

International Preliminary Report on Patentability for International PCT Application No. PCT/US2012/066881, mailed Jun. 12, 2014, 14 pages.

International Search Report and Written Opinion for International PCT Application No. PCT/US2012/066881, mailed Sep. 9, 2013, 19 pages.

* cited by examiner

AUDIO/VIDEO CONNECTOR FOR AN ELECTRONIC DEVICE

CROSS-REFERENCES TO RELATED APPLICATIONS

This application claims benefit under 35 USC §119(e) to U.S. Provisional Patent Application No. 61/565,468, filed Nov. 30, 2011.

This application is related to the following commonly-owned and co-pending U.S. patent application Ser. No. 13/607,550 filed on Sep. 7, 2012, the disclosure of which is incorporated by reference herein in its entirety for all purposes.

BACKGROUND

Connectors are ubiquitous and are used in variety of applications for coupling two electronic devices. Most connectors usually have some sort of contacts that facilitate transmission of signals between the devices connected using a connector. Conventionally, each contact in a connector has a specific pre-assigned function. In other words, each contact in a connector is designated to carry a certain type of signal, e.g., power, data, etc.

It would be desirable to have a connector that can be configured based on the capabilities of the accessory so that a single connector may be used to interface with several accessories.

SUMMARY

Embodiments of the present invention relate to connectors in general. In particular some embodiments of the present invention provide a connector for an electronic device. The connector has two rows of contacts and can be used to provide DisplayPort signals to an accessory that can utilize the DisplayPort signals.

In one embodiment, a first set of contacts of the connector has individually configurable contacts while a second set of contacts are configurable as a group. In this embodiment, each of the contacts in the first set of contacts can be configured to perform one of several available functions depending on the connected accessory. The second set of contacts are designated for providing DisplayPort related signals and are enabled only if the host device determines that the connected accessory supports DisplayPort capabilities.

In another embodiment, each contact in the first and the second set of contacts is individually configurable. Depending on the accessory connected to the host device, each of these contacts can be configured to perform one of several available functions. In the instance where the connected accessory supports DisplayPort capabilities, up to seven contacts of the connector can be configured to handle DisplayPort related signals.

Some embodiments of the present invention provide a DisplayPort adapter has a connector that can be used to convey audio/video signals from a host device to an accessory. In some embodiments, the DisplayPort adapter can convert the audio/video signals received from the host device into one of commonly used audio/video formats. In some embodiments, the DisplayPort adapter can also enable cascading of accessories by providing an additional connector and communication mechanism for enabling additional accessories, e.g., non-DisplayPort capable accessories, to connect to the host device via the adapter.

The following detailed description, together with the accompanying drawings will provide a better understanding of the nature and advantages of the present invention.

DETAILED DESCRIPTION

Figure 1A:
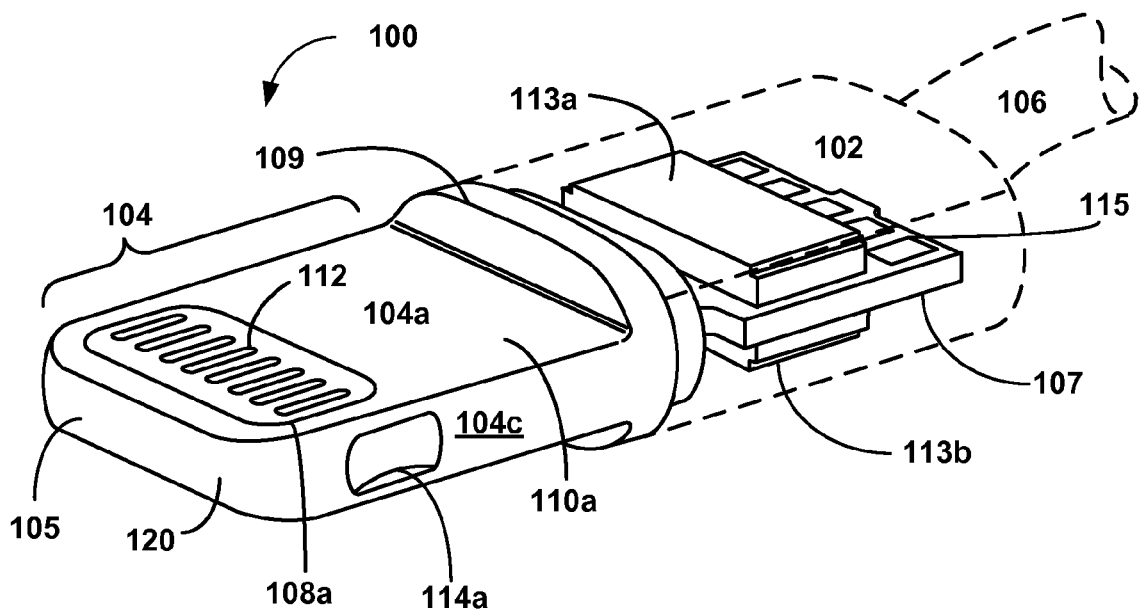
FIG. 1A is an isometric view of a plug connector according to an embodiment of the present invention.

Embodiments of the present invention generally relate to connectors. More specifically, certain embodiments of the present invention provide for a receptacle connector with two rows of contacts. The receptacle connector can provide DisplayPort capabilities in addition to other functionalities. In some embodiments, the receptacle connector can mate with a plug connector having two rows of contacts stacked on one another and isolated from each other.

DisplayPort is a digital display interface that defines a digital interconnect standard for audio and video. The interface is primarily used to connect a video source to a display device such as a computer monitor or television set. DisplayPort relies on packetized data transmission similar to other data communication protocols such as Ethernet, USB, and PCI Express. It supports both external and internal display connections. DisplayPort protocol is based on small data packets with clock embedded. The use of data packets also allows for DisplayPort to be extensible. A DisplayPort connector supports 1, 2, or 4 differential data pairs (lanes) in a Main Link, each with a raw bit rate of 1.62, 2.7, or 5.4 Gbit/s per lane with self-clock running at 162, 270, or 540 MHz. Data is 8b/10b and encoded where each 8 bits of information are encoded with a 10 bit symbol. So the effective data rates after decoding are 1.296, 2.16, and 4.32 Gbit/s per lane.

A DisplayPort signal can be used to transport audio-only content, video-only content, or both audio and video simultaneously. The video signal path supports 6 to 16 bits per color channel and the audio path supports up to 8 channels of 24 bit 192 kHz uncompressed PCM audio which can encapsulate compressed audio formats in the audio stream. A bi-directional, half-duplex auxiliary channel (AUX) carries device management and device control data for the Main Link, such as VESA EDID, MCCS, and DPMS standards. In addition, the interface is capable of carrying bi-directional USB signals.

A host device may use the DisplayPort signals to communicate audio/video information to an external device, e.g., a monitor. However, in order to interface with an external device that is capable of accepting DisplayPort signals, the host device may need the capability to communicate the DisplayPort signals to the external device. Embodiments of the present invention provide a receptacle connector that enables the host device to communicate DisplayPort related signals to an external device.

In some embodiments, the DisplayPort signals provided by the host device may need to be converted into another format, e.g., HDMI, before being transmitted to the external device. In such an instance, a specialized accessory referred to herein generally as a "DisplayPort adapter" or simply "adapter" can provide the necessary conversion of the audio/video signals outputted by the host device into a format useable by an external device.

In some embodiments, the receptacle connector can be associated with a host device and the corresponding plug connector can be associated with an accessory. Once the accessory is connected to the host device, the host device determines that the accessory uses DisplayPort capability and automatically enables the contacts on the receptacle connector that can provide DisplayPort signals. In an embodiment, the accessory can be a DisplayPort adapter that can accept audio/video signals from the host device and communicate them either in a converted form or an unconverted form to another device, e.g., a display device.

FIG. 1A illustrates a plug connector 100 (or accessory-side connector 100) according to an embodiment of the present invention. Plug connector 100 is exemplary and is used herein to explain the various embodiments of the present invention. One skilled in the art will realize that many other forms and types of connectors other than plug connector 100 can be used and that techniques described herein will apply to any plug connector that has the characteristics of plug connector 100. In some embodiments, plug connector 100 may be associated with an accessory that can be coupled to a host device.

Plug connector 100 includes a body 102 and a tab portion 104. A cable 106 is attached to body 102 and tab portion 104 and extends longitudinally away from body 102 in a direction parallel to the length of the connector 100. Tab 104 is sized to be inserted into a corresponding receptacle connector during a mating event and includes a first contact region 108a formed on a first major surface 104a and a second contact region 108b (not shown in FIG. 1A) formed at a second major surface 104b (also not shown in FIG. 1A) opposite surface 104a. Surfaces 104a, 104b extend from a distal tip of the tab to a spine 109 that, when tab 104 is inserted into a corresponding receptacle connector, abuts a housing of the receptacle connector or portable electronic device the receptacle connector is incorporated in. Tab 104 also includes first and second opposing side surfaces 104c, 104d (not shown) that extend between the first and second major surfaces 104a, 104b. In one particular embodiment, tab 104 is about 6.6 mm wide, about 1.5 mm thick and has an insertion depth (the distance from the tip of tab 104 to spine 109) of about 7.9 mm.

A plurality of contacts 112 can be formed in each of contact regions 108a and 108b such that, when tab 104 is inserted into a corresponding receptacle connector, contacts 112 in regions 108a or 108b are electrically coupled to corresponding contacts in the receptacle connector. In some embodiments, contacts 112 are self-cleaning wiping contacts that, after initially coming into contact with a receptacle connector contact during a mating event, slide further past the receptacle connector contact with a wiping motion before reaching a final, desired contact position.

As an example, in one embodiment an ID module is embodied within an IC operatively coupled to the contacts of connector 100. The ID module can be programmed with identification and configuration information about the connector and/or its associated accessory/adapter that can be communicated to a host device during a mating event. As another example, an authentication module programmed to perform an authentication routine, for example a public key encryption routine, with circuitry on the host device can be embodied within an IC operatively coupled to connector 100. The ID module and authentication module can be embodied within the same IC or within different ICs. As still another example, a current regulator can be embodied within one of IC's 113a or 113b. The current regulator can be operatively coupled to contacts that are able to deliver power to charge a battery in the portable electronic device and regulate current delivered over those contacts to ensure a constant current regardless of input voltage and even when the input voltage varies in a transitory manner. The function of the IC's is further described below in reference to FIG. 4.

Bonding pads 115 can also be formed within body 102 near the end of PCB 107. Each bonding pad can be connected to a contact or contact pair within regions 108a and 108b. Wires (not shown) can then be soldered to the bonding pads to provide an electrical connection from the contacts to circuitry within an accessory associated with connector 100. In some embodiments, however, bonding pads are not necessary and instead all electrical connections between the contacts and components of connector 100 and other circuitry within an accessory are made through traces on a PCB that the circuitry is coupled to and/or by interconnects between multiple PCBs within the accessory.

The structure and shape of tab 104 is defined by a ground ring 105 that can be made from stainless steel or another hard conductive material. Connector 100 includes retention features 114a, 114b (not shown) formed as curved pockets in the sides of ground ring 105 that double as ground contacts. Body 102 is shown in FIG. 1A in transparent form (via dotted lines) so that certain components inside the body are visible. As shown, within body 102 is a printed circuit board (PCB) 107 that extends into ground ring 105 between contact regions 108a and 108b towards the distal tip of connector 100. One or more integrated circuits (ICs), such as Application Specific Integrated Circuit (ASIC) chips 113a and 113b, can be operatively coupled to PCB 107 to provide information regarding connector 100 and/or to perform specific functions, such as authentication, identification, contact configuration and current or power regulation.

Figure 1B:
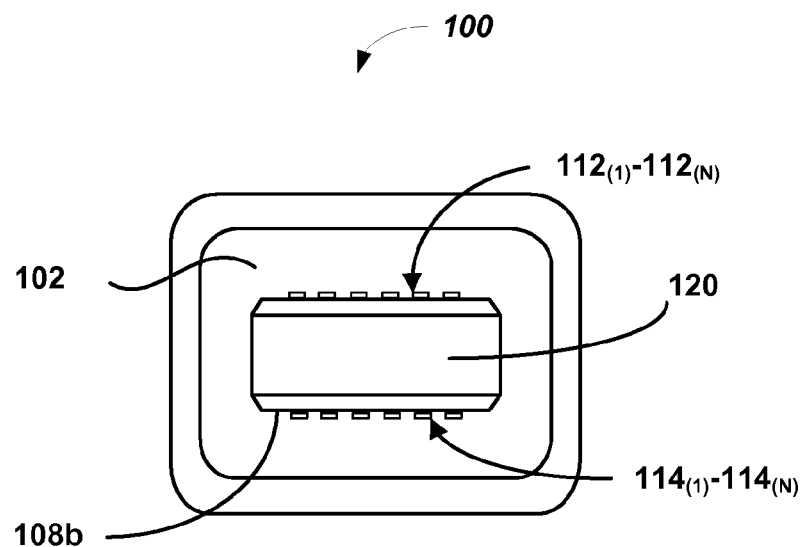
FIG. 1B is a front view of the plug connector according to an embodiment of the present invention.

FIG. 1B illustrates a front view of plug connector 100. The front view illustrates a cap 120. Cap 120 can be made from a metal or other conductive material and can extend from the distal tip of connector 100 along the side of the connector towards body 102 either fully or partially surrounding contacts 112 formed in contact regions 108a and 108b in the X and Y directions. In some embodiments, cap 120 may be grounded in order to minimize interference that may otherwise occur on contacts 112 of connector 100. Thus, cap 120 can function as a ground ring. Contacts $112_{(1)}$-$112_{(N)}$ can be positioned within contact region 108a and additional contacts $114_{(1)}$-$114_{(N)}$ can be positioned within region 108b on the opposing surface of tab 104. In some embodiments, N can be between 2 and 8.

Figure 1C:
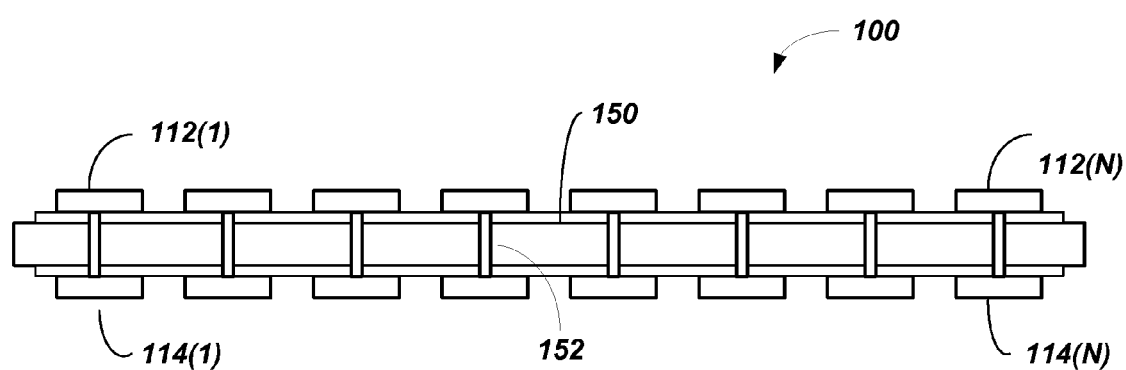
FIG. 1C is a cross-section view of a plug connector according to an embodiment of the present invention.

FIG. 1C illustrates a cross-sectional schematic view of plug connector 100 according to an embodiment of the present invention. In the embodiment illustrated in FIG. 1C, first set of contacts $112_{(1)-(N)}$ and the second set of contacts $114_{(1)-(N)}$ can be mounted on either side of a PCB 150. However, opposing contacts from the two sets of contacts, e.g., contact $112_{(1)}$ and contact $114_{(1)}$ may be shorted together through PCB 150 by one or more vias 152. This creates an "in-line" connector 100 where the two sets of contacts function as a single row of contacts regardless of which set of contacts makes physical connection with the contacts in the receptacle connector. In some embodiments, contacts 112, 114 can be made from a copper, nickel, brass, a metal alloy or any other appropriate conductive material. Spacing is consistent between each of the contacts on the front and back sides and between the contacts and the edges of the connector providing 180 degree symmetry so that plug connector 100 can be inserted into a corresponding receptacle connector in either of two orientations.

Figure 1D:
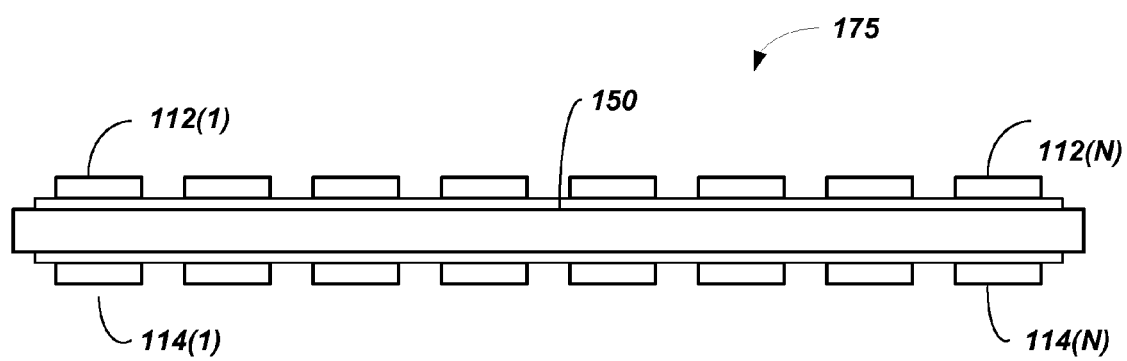
FIG. 1D is a cross-section view of a plug connector according to another embodiment of the present invention.

FIG. 1D illustrates a cross-sectional schematic view of a plug connector 175 according to another embodiment of the present invention. In this embodiment, the two sets of contacts $112_{(1)-(N)}$ and $114_{(1)-(N)}$ are positioned similar to the one described in FIG. 1C. However, in this embodiment, all the contacts in the first set of contacts and the second set of contacts are electrically isolated from each other. Thus, in this embodiment, connector 175 has twice the number of usable contacts as connector 100 of FIG. 1C. Thus, for example, if the connector 100 has 8 contacts on the top and 8 on the bottom, but since they are shorted as described above, connector 100 may only have 8 usable contacts that can carry a max of 8 signals. On the other hand, connector 175 will have 16 independent contacts that can potentially carry 16 signals. A receptacle connector having two sets of contacts corresponding to contacts of connector 175 can accommodate both connector 175 and connector 100. The receptacle connector is described in detail below.

When connector 100 (or 175) is properly engaged with a corresponding receptacle connector, each of contacts $112_{(1)}$-$112_{(N)}$ and $114_{(1)}$-$114_{(N)}$ is in electrical connection with a corresponding contact of the receptacle connector.

Figure 1E:
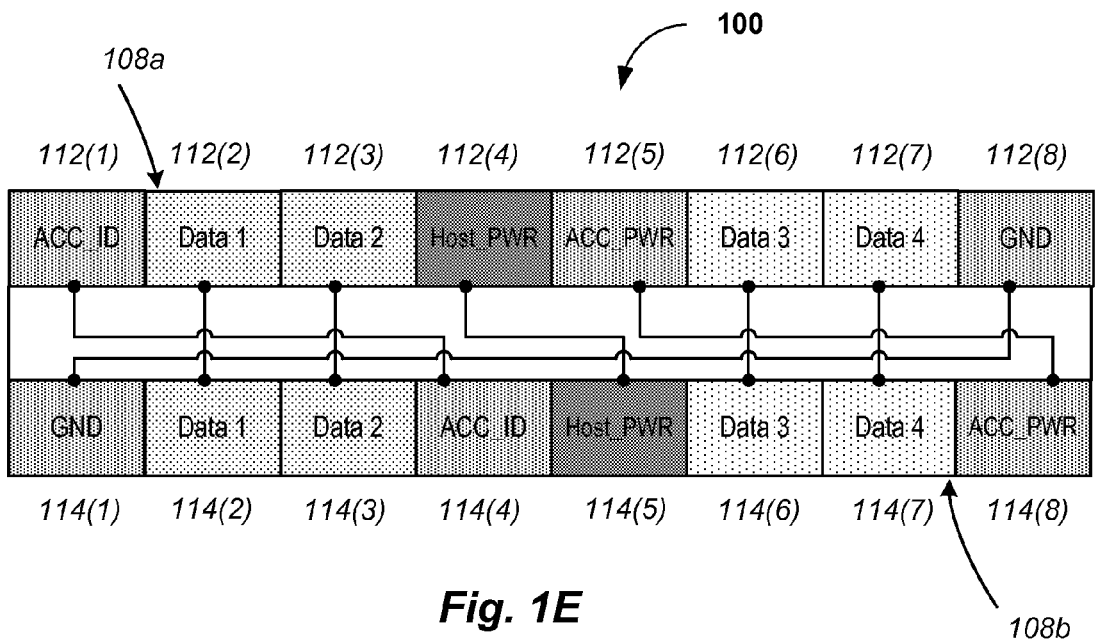
FIG. 1E is a pin-out for a plug connector according to an embodiment of the present invention.

FIG. 1E illustrates a pin-out configuration for connector 100 according another particular embodiment of the present invention.

Connector 100 can be a reversible connector. In other words, based on the orientation in which connector 100 is mated with a corresponding connector of a host device, either the contacts on the surface 108a or 108b are in physical and electrical contact with the contacts in the corresponding connector of the host device. As illustrated in FIG. 1E, connector 100 may have eight contacts arranged on an upper surface of a PCB 150 and eight contacts arranged on a lower surface of PCB 150. Contacts 112(1-N) and 114(1-N) are external and are exposed to the surrounding environment.

Connector 100 includes two contacts 112(1) and 114(4) that can function as accessory ID contacts to carry the identification signals between the accessory and the portable electronic device. Contacts 112(1) and 114(4) are electrically connected to each other as illustrated in FIG. 1E. Connector 100 can have four pairs of data contacts, (a) 112(2) and 112(3), (b) 112(6) and 112(7), (c) 114(2) and 114(3), and (d) 114(6) and 114(7). In this particular embodiment, opposing data contacts, e.g., 112(2) and 114(2), are electrically connected to each other via PCB 150 as illustrated in FIG. 1E. Connector 100 may further include host power contacts 112(4) or 114(5) that may be electrically connected to each other. Host power contacts 112(4) or 114(5) can carry power to the host device that is mated with connector 100. For example, plug connector 100 may be part of a power supply system designed to provide power to the host device. In this instance, either contact 112(4) or 114(5) may carry power from the power supply to the host device, e.g., to charge a battery in the host device.

Connector 100 may further include accessory power contacts 112(5) and 114(8) that may be electrically connected to each other, e.g., via PCB 150. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of connector 100 with respect to a corresponding connector of the host device. Connector 100 may further include two ground contacts 112(8) and 114(1) electrically connected to each other. The ground contacts provide a ground path for connector 100.

Figure 1F:
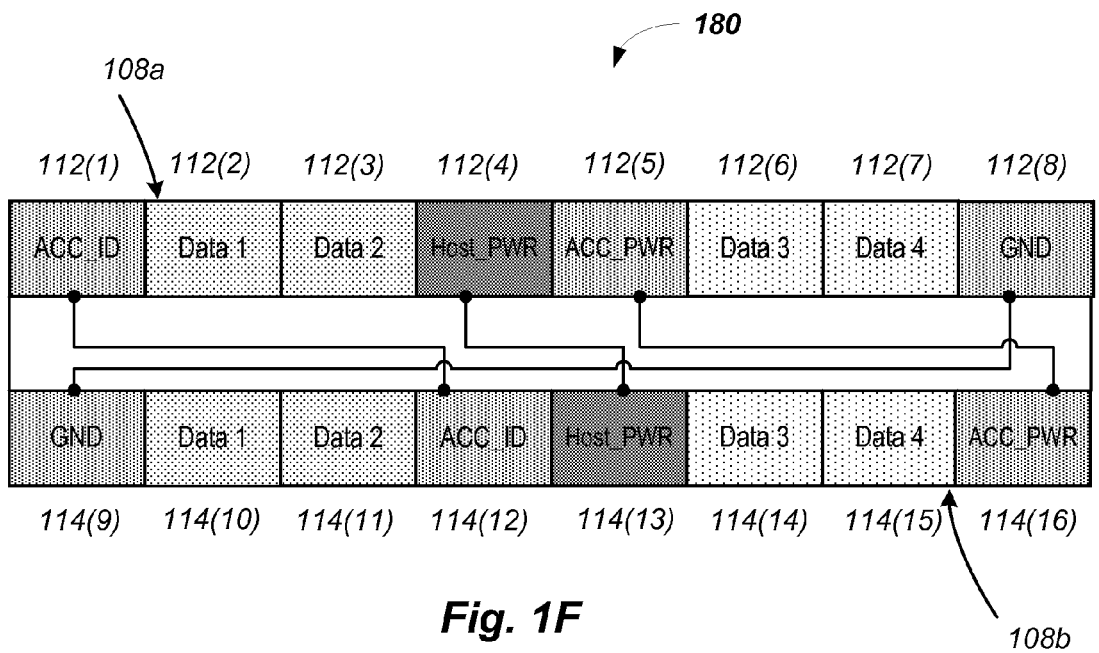
FIG. 1F is a pin-out for a plug connector according to another embodiment of the present invention.

FIG. 1F illustrates a pin-out for a plug connector 180 according to another embodiment of the present invention. Connector 180 can be same as connector 100 with external contacts. The pin-out of FIG. 1F can be used for hi-speed and data intensive communications such as via USB 3.0 and Thunderbolt® data interface developed by Apple Inc. The difference between the plug connector of FIG. 1E and that of FIG. 1F is that the data contacts on the top and bottom are not electrically connected to each other. Thus, while the pin-out of FIG. 1E provides a plug connector with two active data pairs regardless of the orientation of the plug connector, the pin-out illustrated in FIG. 1F provides a plug connector with four (4) active data pairs for use in data communication. This effectively increases the amount of data than can be transferred between a host device and an accessory. The data contacts can be high speed data contacts that operate at rate that is at least two orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals. Many different types of digital signals can be carried by the data contacts including data signals such as, USB signals (including USB 1.0, 2.0 and 3.0), FireWire (also referred to as IEEE 1394) signals, UART signals, Thunderbolt signals, SATA signals and/or any other type of high speed serial interface signal or other type of data signal. Digital signals may also include signals for digital video such as DVI signals, HDMI signals and Display Port signals, as well as other digital signals that perform functions that enable the detection and identification of devices or accessories to connector 180.

As illustrated in FIG. 1F, connector 180 also provides two pins for ground (GND) contacts and two pins for providing power to the host device (Host_PWR). Plug connector 180 can either be keyed or can be reversible. Since plug connector has independent top and bottom data contacts, a corresponding receptacle connector may also need to have two rows of corresponding data contacts in order to utilize the additional data contacts available in plug connector 180 compared to plug connector 100 described above.

In a particular embodiment illustrated in FIG. 1F, there are two pairs of data contacts in each of the contact regions 108$a$ and 108$b$. The four pairs of data contacts are arranged such that two pairs of data contacts in contact region 108$a$ are disposed exactly opposite to the other two pairs of data contacts in region 108$b$. The contacts on each of the surfaces 108$a$ and 108$b$ are arranged such that (a) at least one pair of data contacts is disposed between a host power (Host_PWR) contact and an accessory ID contact and (b) at least one pair of data contacts is disposed between an accessory power (ACC_PWR) contact and a ground (GND) contact. The Host_PWR contact is disposed between the two pairs of data contacts on each of the two contact surfaces 108$a$ and 108$b$.

Figure 2:
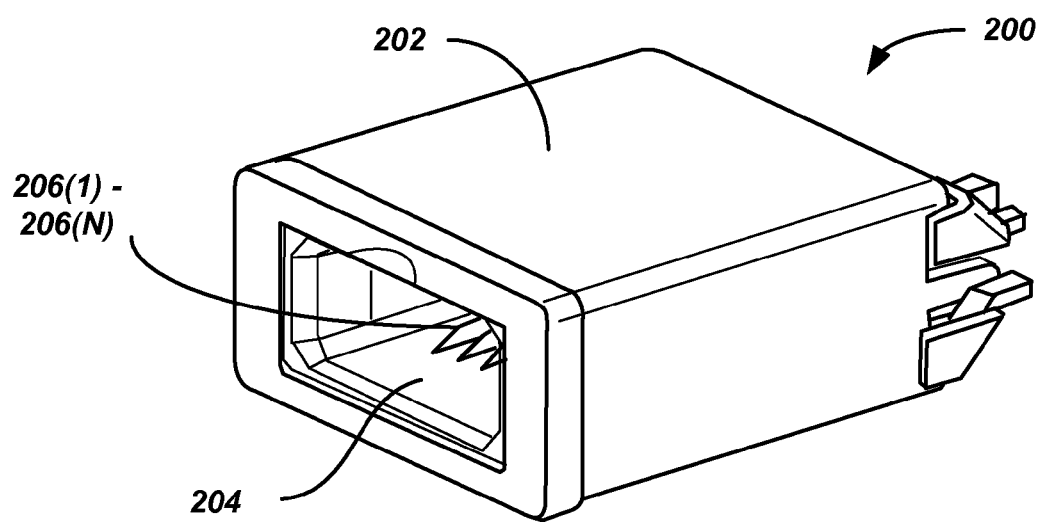
FIG. 2 is an isometric view of a receptacle connector according to an embodiment of the present invention.

FIG. 2 illustrates a receptacle connector 200 according to an embodiment of the present invention. Receptacle connector 200 includes a housing 202 that defines a cavity 204 and houses two rows of N contacts each $206_{(1)}$-$206_{(N)}$ and $207_{(1)}$-$207_{(N)}$ (not shown) within the cavity. In operation, a connector, such as plug connector 100 (or 175) can be inserted into cavity 204 to electrically couple the contacts $112_{(1)}$-$112_{(N)}$ to contacts $206_{(1)}$-$206_{(N)}$ and couple contacts $114_{(1)}$-$114_{(N)}$ to contacts $207_{(1)}$-$207_{(N)}$ or vice versa. Each of the receptacle contacts $206_{(1)}$-$206_{(N)}$ and $207_{(1)}$-$207_{(N)}$ electrically connects its respective plug contact to circuitry associated with the electrical device in which receptacle connector 200 is housed. For example, receptacle connector 200 can be part of a portable media device and electronic circuitry associated with the media device is electrically connected to receptacle 200 by soldering tips of contacts $206_{(1)}$-$206_{(N)}$ and $207_{(1)}$-$207_{(N)}$ that extend outside housing 202 to a multilayer board such as a printed circuit board (PCB) within the portable media device.

In one embodiment, receptacle connector 200 may only have a single row of contacts, e.g., along a bottom surface of cavity 204.

In one embodiment, receptacle connector 200 is keyed such that it can mate with a corresponding plug connector 100 in only one way. For example, plug connector 100 can only be inserted into receptacle connector 200 in one orientation. In this embodiment, the orientation of plug connector 100 is always known and fixed and does not vary.

Figure 3:
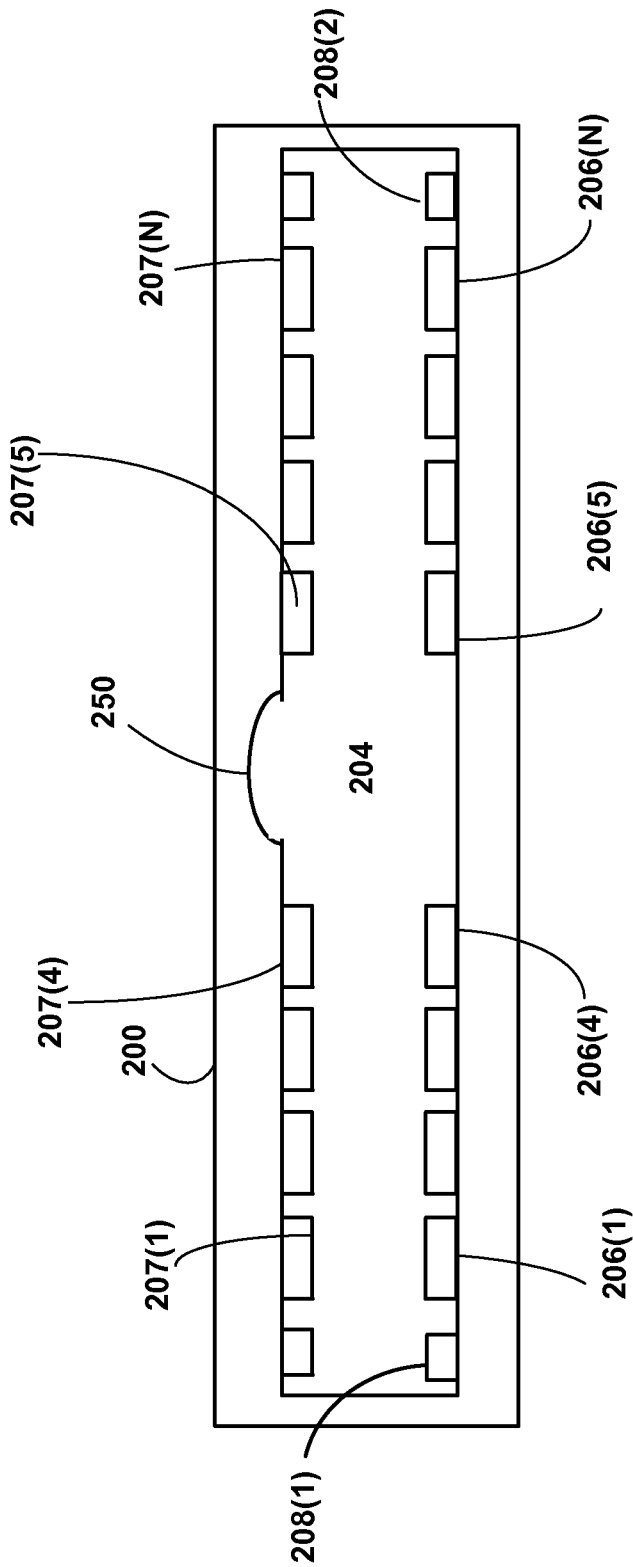
FIG. 3 is a cross-sectional view of a receptacle connector according to an embodiment of the present invention.

FIG. 3 is a cross-sectional view of receptacle connector 200 according to an embodiment of the present invention. As illustrated in FIG. 3, connector 200 has a bottom row of contacts $206_{(1)}$-$206_{(N)}$ and a top row of contacts $207_{(1)}$-$207_{(N)}$. In addition, connector 200 can have a channel 250 in the top section of connector 200. Channel 250 can extend the entire depth of connector 250 or only to a certain distance along the depth of connector 250. A corresponding plug connector can have a similar channel in the upper section of its housing in order to properly mate with connector 200. Channel 250 ensures that a corresponding plug connector having a similar channel can only be inserted into connector 200 in a single fixed orientation. A different plug connector that does not have a corresponding channel can also be inserted into connector 200. Thus connector 200 can accept a correspondingly keyed or a non-keyed plug connector. In addition, connector 200 can also include contacts 208(1) and 208(2). These contacts can be used to detect physical insertion of the plug connector into connector 200. However, contacts 208(1) and 208(2) are optional. In the embodiment illustrated in FIG. 3, receptacle connector 200 can have 8 signal contacts on the top and 8 signal contacts in the bottom.

In an embodiment, the top contacts $207_{(1)}$-$207_{(8)}$ cab be designated for carrying DisplayPort related signals to and from the host device and an accessory. In a specific embodiment, out of the 8 top row contacts $207_{(1)}$-$207_{(8)}$ only seven contacts may be used for providing DisplayPort capability. Out of the seven contacts, four contacts can be used to carry audio/video data, one contact is used for detecting connection of a compatible accessory, and up to two contacts are used to carry control and device management signals to and from the host device. The top row contacts $207_{(1)}$-$207_{(8)}$ are enabled only when a compatible accessory is detected as being connected to the host device. For example, a compatible accessory may be a video dongle that converts the audio/video signals outputted by the host device into an HDMI signal for use by other connected accessories. It is to be noted that the corresponding plug connector of the accessory may also have two rows of contacts, e.g., as illustrated in FIG. 1D.

In a specific embodiment, either contact $207_{(4)}$ or contact $207_{(5)}$ is designated to carry the hot plug detect signal for the DisplayPort. In a typical implementation involving connector 200, either one or both contacts $206_{(4)}$ and contact $206_{(5)}$ may be designated for carrying a power signal. In some embodiments, the power signal can be between 3V and 30V. Compared to the power contact all other contacts in the bottom row are low voltage contacts with a maximum tolerance of about 5V. Thus, any contact that is in close proximity to the power contacts must be able to withstand the higher voltages if they are present on the power contact. A hot plug detect signal is designed to be tolerant to high voltages. Therefore, it is beneficial to place the hot plug detect signal of the DisplayPort directly above the power contacts of connector 200.

Figure 4:
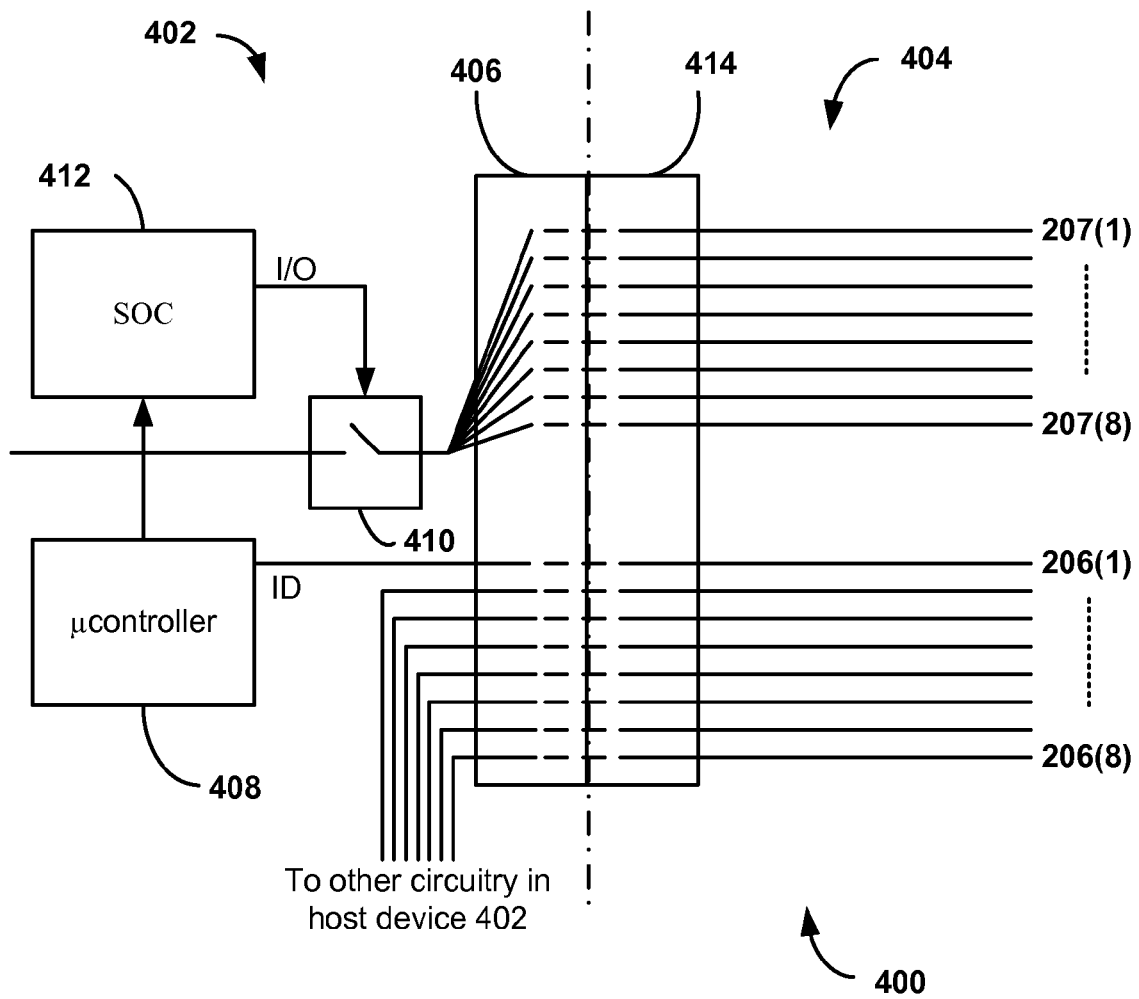
FIG. 4 is a simplified schematic of a system according to an embodiment of the present invention.

FIG. 4 is a schematic of a system 400 for providing DisplayPort capabilities according to an embodiment of the present invention. System 400 includes a host device 402 and an accessory 404. Host device 402 includes a host-side receptacle connector 406, similar to connector 200 described above. Host device 402 also include a microcontroller 408, multiplexer/switch 410, and other control circuitry 412.

Microcontroller 408 can be implemented using one or more integrated circuits. In some embodiments, microcontroller 408 can include circuitry for determining a type of accessory connected to the host device based on information received from the accessory.

Microcontroller 408 also configures the bottom row of contacts $206_{(1)}$-$206_{(8)}$ based on the connected accessory. The function and configuration of the bottom row of contacts is explained in detail in commonly owned and co-pending U.S. Provisional Application No. 61/556,792, filed on Nov. 7, 2011 and U.S. Provisional Application No. 61/565,463 filed on Nov. 30, 2011, both of these applications are incorporated by reference herein in their entirety for all purposes.

Multiplexer/switch 410 is configured to either enable or disable the top row contacts $207_{(1)}$-$207_{(8)}$. In some embodiments, a single multiplexer switch 410 is used for all top row contacts $207_{(1)}$-$207_{(8)}$. In other embodiments, a separate multiplexer/switch may be used for each contact $207_{(1)}$-$207_{(8)}$.

Control circuitry 412, which can be implement using an Application Specific Integrated Circuit (ASIC) can be used to control operation of host device 402 including controlling switch 410. In a particular embodiment, control circuitry can receive a signal from microcontroller 408 and based on that signal generate an I/O signal for controlling switch 410.

System 400 also includes an accessory-side plug connector 414 that also has two rows of contact. Accessory-side connector may be similar to connector 100 of FIG. 1.

In operation, once plug connector 414 of the accessory is mated with receptacle connector 406, host device 402 receives information about the accessory over one of the contacts in the bottom row, e.g., contact $206_{(1)}$ as illustrated in FIG. 4. In a particular embodiment the information received is accessory identification information that may include an indication of whether accessory 404 supports DisplayPort capabilities. Based on the information, microcontroller 408 determines whether the accessory uses DisplayPort capabilities. If microcontroller 408 determines that the accessory supports DisplayPort capabilities, microcontroller 408 instructs control circuitry 412 to operate multiplexer/switch 410 and enable the top row contacts $207_{(1)}$-$207_{(8)}$ of receptacle connector. Once the top row contacts of the receptacle connector are enabled, host device 402 can exchange DisplayPort related audio, video, and control signals with accessory 404.

It will be appreciated that the system configurations and components for system 400 described herein are illustrative and that variations and modifications are possible. The device and/or accessory may have other components not specifically described herein. Further, while the device and the accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Figure 5:
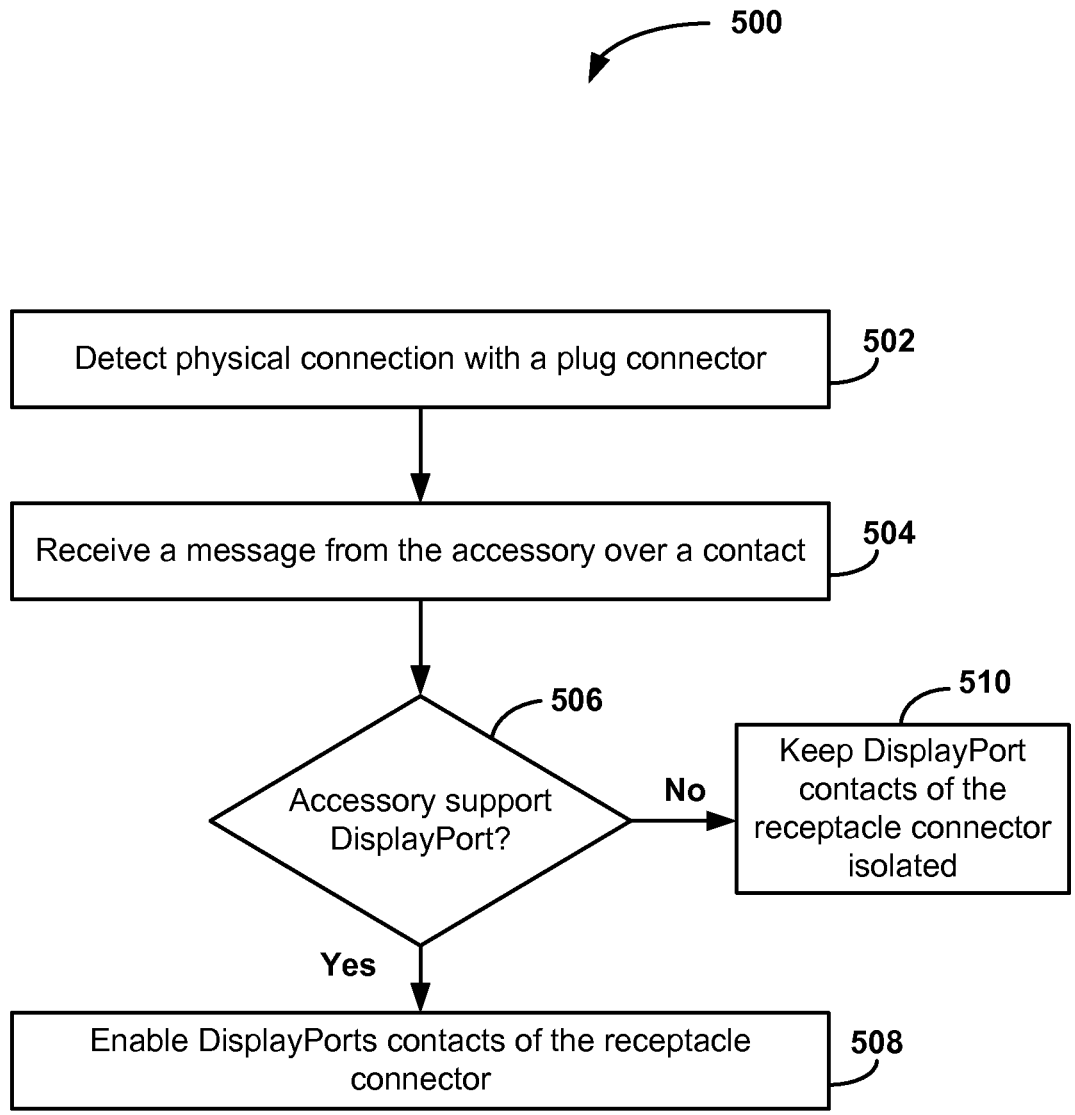
FIG. 5 is a flow diagram of a process for configuring contacts of a receptacle connector according to an embodiment of the present invention.

FIG. 5 is a flow diagram of a process 500 for configuring a receptacle connector having a first set of contacts (e.g., bottom row) and a second set of contacts (e.g., top row) according to an embodiment of the present invention. Process 500 can be performed by, e.g., host device 402 of FIG. 4. It is to be noted that in this embodiment, the plug connector and the receptacle connector can only be mated in a single, fixed orientation.

As described above, initially the multiplexer/switch 410 in the host device is in an "open" state. Thus, the second set of contacts, e.g., the DisplayPort contacts, in the receptacle connector are isolated from the rest of the circuitry within the host device. Once an accessory-side plug connector is mated with the receptacle connector, the host device can detect the mating, e.g., using a dedicated connection detection contact in the receptacle connector (502). Once it is determined that the plug connector has been physically mated with the receptacle connector, the host device can receive a message from the accessory via one of the contacts in the receptacle connector (504). In some embodiments, the accessory may automatically send this message upon physical mating between the two connectors. In this instance, the accessory will have the requisite intelligence to determine that the plug connector has been physically mated with the receptacle connector. In some embodiments, the detection by the accessory may include purely mechanical techniques, purely electrical detection techniques, or a combination of mechanical and electrical techniques. In other embodiments, upon detection of physical mating by the host device as described above, the host device may send a request to the accessory requesting certain information and the message sent by the accessory may be in response to that request. In some embodiments, the message includes information about the accessory such as accessory capabilities, type of accessory, an accessory identifier, etc.

The host device analyzes the received message and determines the type of accessory that is connected and whether the accessory supports DisplayPort capability (506). In some embodiments, the message may indicate that the connected accessory is an audio accessory, a video accessory, etc. If the host device determines that the connected accessory supports DisplayPort capabilities, the host device enables the second set of contacts that are designated for DisplayPort signals (508). For example, the microcontroller in the host device receives the message from the accessory and determines whether the accessory supports DisplayPort capabilities. If yes, the microcontroller sends a signal to the control circuitry, which in turn "closes" the multiplexer/switch associated with the second set of contacts thus activating the second set of contacts. In addition, the host device may also configure the first set of contacts for performing other functions based on the type of accessory.

If the host device determines that the connected accessory does not support displayport capabilities (506), it keeps the multiplexer/switch "open" thereby keeping the second set of contacts in a deactivated/isolated state (510). However, the host device may still configure the first set of contacts based on the information received from accessory in order to communicate with the accessory.

It should be appreciated that the specific steps illustrated in FIG. 5 provides a particular method for configuring contacts according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

In this embodiment, the receptacle connector may not be keyed and hence a corresponding plug connector can be inserted into connector 200 in either of two orientations that are 180 degrees rotated from each other. The receptacle connector in this embodiment is essentially similar to receptacle connector 200, but without the projection 250.

In the embodiment described above, the second set of contacts in the receptacle connector are configurable only as a group and each contact in the second set of contacts performs a predetermined function once enabled. In another embodiment of the receptacle connector described herein, each contact in the first and the second set of contacts is individually configurable.

In this instance, since the plug connector can be mated with the receptacle connector in more than one orientation, it may be beneficial to first determine the orientation of the plug connector with respect to the receptacle connector before any of the contacts in the receptacle are configured. Once the orientation is determined, the host device can determine which contacts of the plug connector are associated with which function and accordingly configure the contacts on the receptacle connector.

Figure 6:
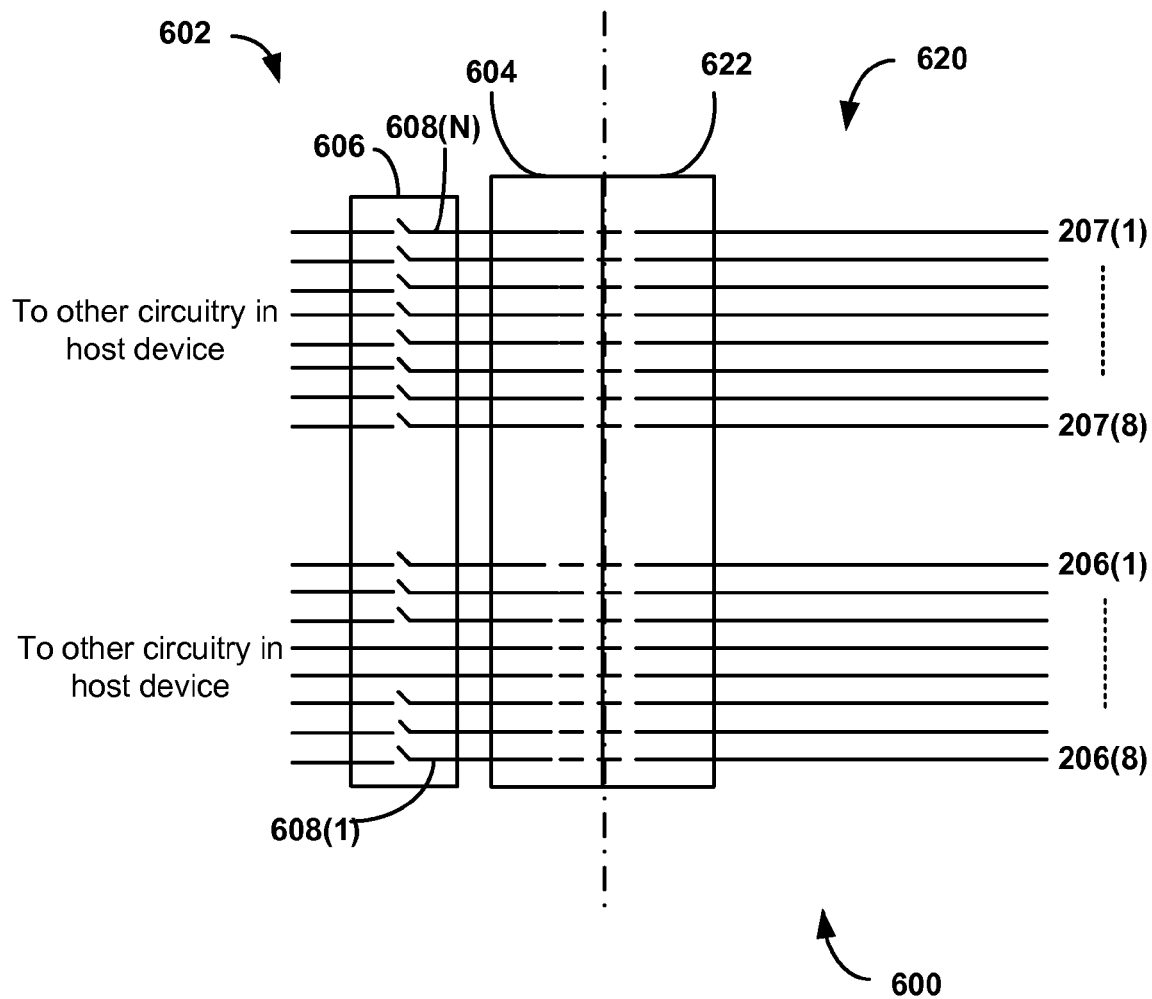
FIG. 6 is a simplified schematic of a system according to another embodiment of the present invention.

FIG. 6 is a schematic diagram of a system 600 illustrating host device including an receptacle connector 604 with up to 16 configurable contacts. Some of the 16 contacts can be configured to communicate DisplayPort related signals if the connected accessory is deemed to support DisplayPort capability.

System 600 includes a host device 602 that includes a receptacle connector 604. In an embodiment, receptacle connector 604 has up to 16 contacts for signal communication similar to receptacle connector 200 of FIG. 2. In some embodiments, receptacle connector 604 may have additional contacts for physical connection detection (not shown) with a corresponding plug connector. Host device 602 includes a microcontroller 606, which is similar to microcontroller 408 described above. In this embodiment, microcontroller 606 includes a plurality of switches 608(1)-(N). Each of the switches is associated with a single contact of receptacle connector 604. Each switch is capable of configuring its associated contact to perform one of several available functions. The available functions depend on the type and capabilities of the accessory and/or the host device. It is to be noted that some contacts of receptacle connector 604 may not have an associated switch and thus may not be configurable.

Accessory 620 has a corresponding plug connector 622 that can also have up to 16 contacts arranged in two rows of eight each similar to connector 100 of FIG. 1.

Just as in the previous embodiment, once connected, the accessory can send a message to the host device informing the host device about the type of accessory and whether the accessory supports DisplayPort capabilities. In addition, the accessory may also send configuration information about the contacts of plug connector 622. Specifically, accessory 620 may send information indicating a function that is associated with each of the contacts of plug connector 622. Based on this information the host device may operate each individual switch 608 associated with a contact of receptacle connector 604 and configure the contact appropriately so as to match the function of its corresponding contact in plug connector 622.

In some embodiments, where plug connector 622 can be mated with receptacle connector 604 in more than one orientation, host device 602 may determine the orientation of the plug connector before the configuration of the receptacle connector contacts can occur. Methods for determining orientation are provided in the US patent application that is incorporated by reference herein as mentioned above. The methods are not repeated here for sake of brevity. Once the orientation of the plug connector is determined, the host device knows which contacts of the receptacle connector are in physical contact with which of the contacts of the plug connector. In addition, the host device also receives information indicating a function that is associated with each of the contacts of plug connector 622 as described above. Using these two items of information, the host device now can configure each of the contacts of the receptacle connector to match the functions of the plug connector.

In some embodiments, the connected accessory may support DisplayPort capabilities. Thus, in this instance, some of the contacts may be configured to carry displayport signals. In some embodiments, the DisplayPort related contacts may either all be grouped in the top row of contacts or the bottom row of contacts. In other embodiments, the DisplayPort related contacts may be randomly distributed across all available contacts.

Figure 7:
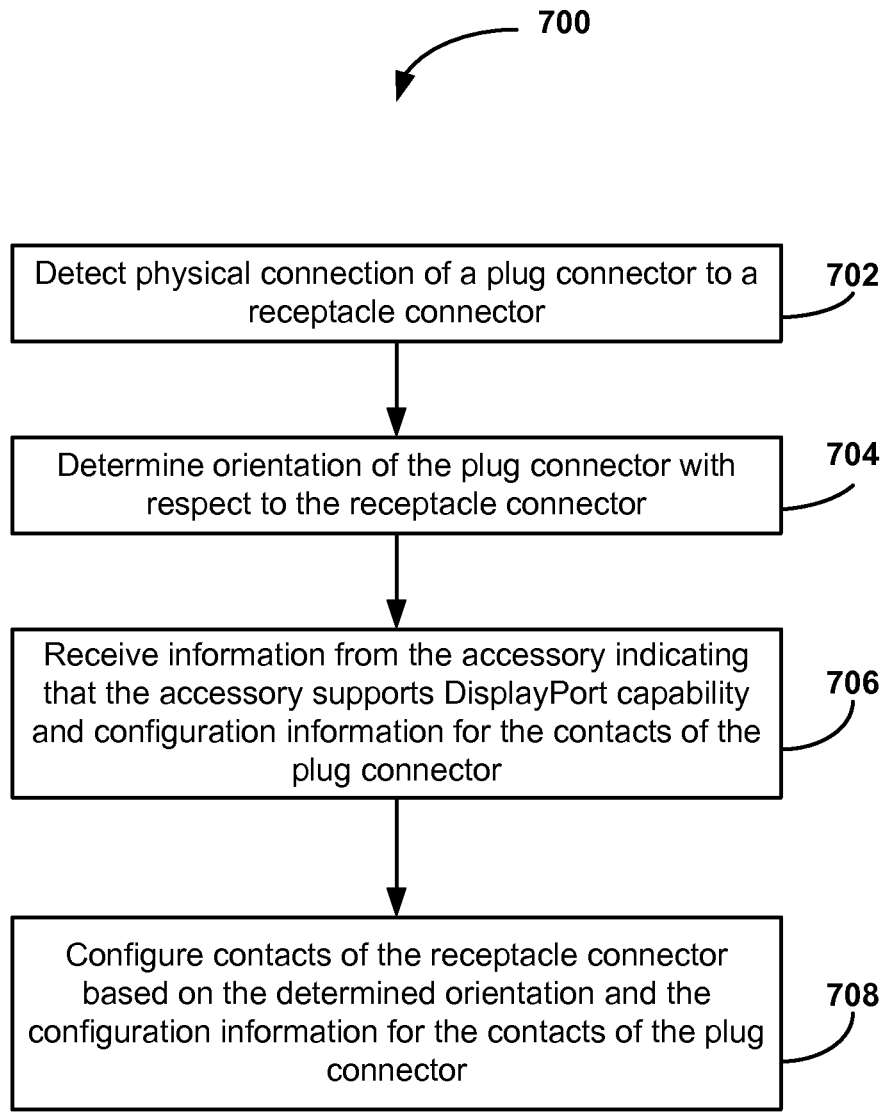
FIG. 7 is a flow diagram of a process for configuring contacts of a receptacle connector according to another embodiment of the present invention.

FIG. 7 is a flow diagram of a process 700 for configuring contacts of a connector according to an embodiment of the present invention. Process 700 can be performed, e.g., by host device 602 of FIG. 6.

Initially the host device places all of the switches associated with the contacts in the receptacle connector in an "open" state thus isolating all the contacts from the internal circuitry of the host device. Thereafter the host device detects physical connection of a plug connector with the receptacle connector (702). Once the physical connection is confirmed, the host then communicates with the accessory in order to determine the orientation of the plug connector (704). Details of the orientation detection is disclosed at least in U.S. Provisional Application No. 61/556,792, filed on Nov. 7, 2011, which is incorporated by reference herein and hence is not repeated again. The host device receives information from the accessory that indicates whether the accessory supports DisplayPort capabilities and configuration information for the contacts of the plug connector (706).

If the accessory supports DisplayPort capabilities, the host device can then configure the contacts of the receptacle connector based on the configuration information for the contacts of the plug connector and the information about the orientation of the plug connector (708).

It should be appreciated that the specific steps illustrated in FIG. 7 provides a particular method for configuring contacts according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Figure 10:
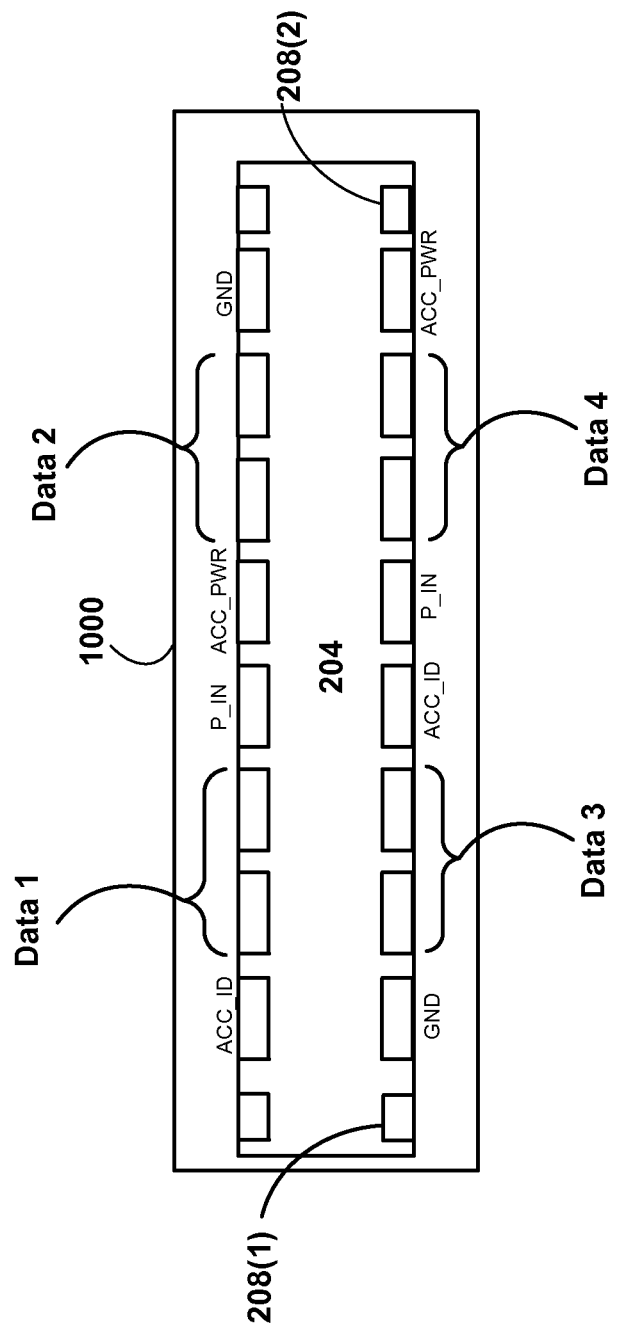
FIG. 10 is a cross-section of a receptacle connector showing a pin-out according to another embodiment of the present invention.

As described above, in some embodiments, the plug connector may not be keyed and thus may be reversible. For example, FIG. 1F above illustrates a plug connector that is reversible and has independent data contacts. FIG. 10 illustrates a pin-out for a receptacle connector 1000 that can be used with plug connector 180 of FIG. 1F, according to an embodiment of the present invention.

As can be seen from FIG. 10, receptacle connector 100 is not keyed and thus can accept a corresponding plug connector in any of the two orientations described above. Since plug connector 180 can have up to 4 pairs of data contacts, receptacle 1000 can also have four pairs of corresponding contacts that can be configured to carry data, e.g., Data 1 . . . Data 4. Each of the contacts that make up the data contact pairs has a configuration switch, e.g., similar to switches described in relation to FIG. 6. Once the plug connector is coupled to receptacle connector 1000, the host device can determine in which of the two orientations is the plug connector coupled to the receptacle connector, e.g., using the techniques described above. Once the orientation is known, the host device can determine which contacts of the plug connector are in physical connections with which contacts in receptacle connector 1000.

As illustrated in FIG. 10, receptacle connector includes two ground contacts (GND), one each on the upper surface and the lower surface of the receptacle connector. Once the plug connector is mated with the receptacle connectors, the two GND contacts in the receptacle connector are in physical contacts with the two grounds contacts of the plug connector thus providing a solid ground connection that may be needed for the hi-speed data that the connectors are designed to carry. Depending on the orientation of the plug connector, either the ACC_ID contact on the upper surface of cavity 204 or the one on the lower surface can be configured to carry the identification signal provided by the accessory. Once it is determined which of the two contacts carries accessory identification signal, at least one contact in the same row can be configured to carry power to the accessory (ACC_PWR) and another contact in the same row can be configured to carry power to the host device (P_IN). The remaining contacts in the same row can then be used for transmitting/receiving data, e.g., the data pair contacts described above.

From among the four pairs of data contacts available in receptacle connector 1000 (and corresponding plug connector 180), two data contacts can be dedicate to a displayport auxiliary signal and two other data contacts can be dedicated to a displayport hot plug detect signal. In some embodiments, connector 180 can accommodate two lanes of displayport video along with displayport hot plug detect (HPD) and auxillary (Aux) signals. The remaining data contacts can be configured to accommodate other communication interfaces such as USB 2.0, Mikey Bus, or a universal asynchronous receiver/transmitter (UART) interface.

In other embodiments, some of the data contacts can be configured to carry HDMI signals in addition to or in lieu of displayport and other communication signals. As discussed above, the data contacts can be high speed data contacts that operate at rate that is at least two orders of magnitude faster than the accessory ID signals making it look essentially like a DC signal to the high speed data lines. Thus, positioning the data contacts between either the power contacts or ground contacts and the ACC contacts improves signal integrity by sandwiching the data contacts between contacts designated for DC signals or essentially DC signals.

Figure 8:
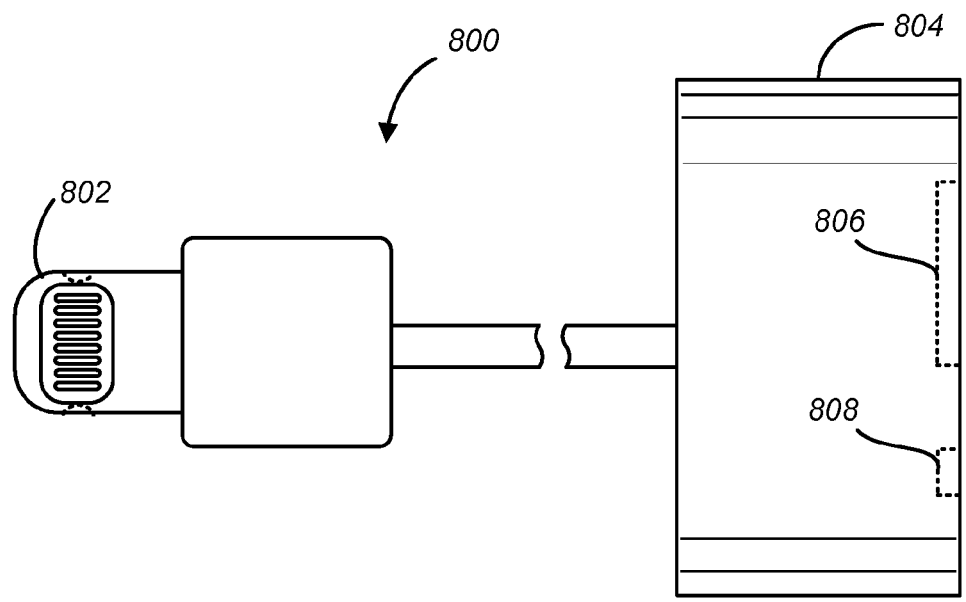
FIG. 8 is a simplified top view of a DisplayPort adapter according to an embodiment of the present invention.

FIG. 8 is a simplified top view of a DisplayPort adapter 800 than can be used to receive audio/video signals from a host device and communicate them to another device either in an converted form or an unconverted form according to an embodiment of the present invention. DisplayPort adapter 800 includes a plug connector 802 similar to plug connector 100 of FIG. 1A (or connector 180 of FIG. 1F). Adapter 800 includes an adapter housing 804 within which is a video connector 806. In one embodiment video connector 806 is an HDMI receptacle connector, in another embodiment connector 806 is a VGA receptacle connector, and in still another embodiment connector 806 is a component video connector. A video processor (not shown) separates audio and video data sent over connector 802 and converts the data to the appropriate format for output over connector 806.

In some embodiments adapter 800 also includes a receptacle connector 808 that includes the same pinout and physical form factor as connector 200 of FIG. 2. Any plug connector that can mate with connector 200 could also mate with connector 808. Connector 808 enables other accessories to be coupled to the same host device that connector 802 is coupled with via a cascaded connection. A controller (not shown) is coupled to connector 808 and provides all the functionality (authentication, contact switching, etc.) that the host device provides with respect to connector 200. Thus, the controller can set the contacts of connector 808 in the same manner that the switching circuitry can set contacts 206(1) . . . 206(N), as described above.

Figure 9:
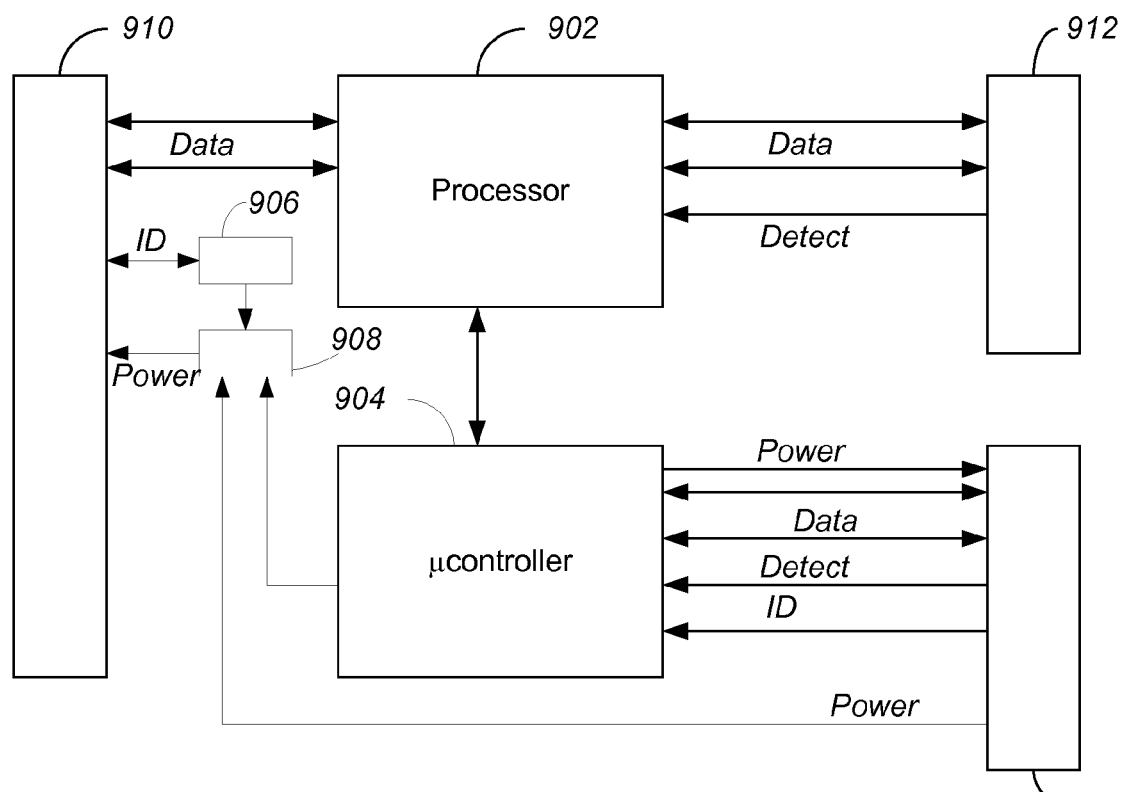
FIG. 9 is a simplified functional block diagram of a DisplayPort adapter according to an embodiment of the present invention.

FIG. 9 is a simplified functional block diagram of a DisplayPort adapter according to an embodiment of the present invention.

The DisplayPort adapter includes a first connector 910, which can be similar to plug connector 802 of FIG. 8. First connector 910 can be used to couple the DisplayPort adapter to a host device that can be a source for audio/video information. The DisplayPort adapter also includes a second connector 912, which can be similar to connector 806 of FIG. 8. Connector 912 can be used to couple an accessory to the DisplayPort adapter in order to receive the audio/video signals from the host device. Connector 912 can be any one of the many commonly known audio/video connectors such as HDMI, VGA, Component video, S-video, Composite audio/video (RCA), etc.

The DisplayPort adapter may also optionally include another connector 914. In an embodiment, connector 914 may be same as connector 910. In other embodiments, connector 914 may be similar to connector 100 of FIG. 1C or 1E or connector 180 of FIG. 1F. In other embodiments, connector 914 may be same as receptacle connector 200 of FIG. 2. Connector 914 may be used to couple other accessories to the host device, e.g., accessories that do not support DisplayPort capabilities. In some embodiments, a cascading chain of accessories may be created using one or more of these adapters.

Processor 902, which can be implemented a single integrated circuit or as a combination of discrete circuits can be used to control the operation of the DisplayPort adapter. In some embodiments, processor 902 can convert the audio/video signals received from the host device via connector 910 into one of many conventional audio/video formats such as HDMI, VGA, Component video, S-video, Composite audio/video (RCA), etc. The converted audio/video signals can be communicate to external accessories via connector 912. In some embodiments, processor 902 may also handle authentication of the DisplayPort adapter to the host device and other connected accessories.

Microcontroller 904 can be implemented as a single ASIC or as a combination of several discrete components. Microcontroller 904 can be used to identify and communicate with additional accessories connected to the DisplayPort adapter via connector 914. In some embodiments, Microcontroller may facilitate transmission of power from the additional accessory to the host device via the power control circuit 908.

ID module 908, which can be implemented as a single integrated circuit or a combination of discrete circuits, can be used to provide identification information about the DisplayPort adapter to the host device. In some embodiments, ID module 908 can also provide configuration information of the contacts of connector 910 to the host device.

It will be appreciated that the system configurations and components described herein are illustrative and that variations and modifications are possible. The DisplayPort adapter may have other components not specifically described herein. Further, while the DisplayPort adapter is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. An electronic device comprising:
   a receptacle connector having a housing that defines an insertion cavity adapted to receive a corresponding plug connector, a first set of contacts positioned on a first side of the insertion cavity, and a second set of contacts positioned on a second side of the insertion cavity opposite the first side, the first set of contacts including first and second pairs of data contacts and the second set of contacts including third and fourth pairs of data contacts;
   a processor and circuitry coupled to the receptacle connector and configured to: (i) disable the second set of contacts; (ii) detect mating of a plug connector associated with a second electronic device with the receptacle connector; (iii) receive information from the second electronic device indicating whether the second electronic device supports DisplayPort capabilities; and (iv) configure the first and second pairs of data contacts and, if the received information indicates the second electronic device does not support DisplayPort capabilities, keeping the second set of contacts disabled.

2. The electronic device of claim 1 wherein the processor and circuitry are further configured to activate the second set of contacts if the received information indicates the second electronic device supports DisplayPort capabilities.

3. The electronic device of claim 2 wherein the first and second sets of contacts are each a single row of contacts opposite each other arranged in a manner that enables a corresponding plug connector to be mated with the receptacle connector in either a first orientation or a second orientation rotated 180 degrees from the first orientation.

4. The electronic device of claim 3 wherein the circuitry includes a multiplexor switch configured to enable and disable the second set of contacts.

5. The electronic device of claim 4 wherein the multiplexor switch is a single switch that enables and disables all contacts in the second row of contacts.

6. An electronic device comprising:
   a receptacle connector having a housing that defines an insertion cavity adapted to receive a corresponding plug connector, a first row of contacts positioned on a first side of the insertion cavity, and a second row of contacts positioned on a second side of the insertion cavity opposite the first side, the first row of contacts including first and second pairs of data contacts and the second row of contacts including third and fourth pairs of data contacts;
   a processor and circuitry coupled to the receptacle connector and configured to: (i) disable the third and fourth pairs of data contacts; (ii) detect mating of a plug connector associated with a second electronic device with the receptacle connector; (iii) receive information from the second electronic device indicating whether the second electronic device supports a predetermined digital interconnect standard; and (iv) if the received information indicates the second electronic device supports the predetermined digital interconnect standard, configure each of the first, second, third and fourth pairs of data contacts to enable exchange of data between the electronic device and the second electronic device over the first, second, third and fourth pairs of data contacts; otherwise if the received information indicates the second electronic device does not support the predetermined digital interconnect standard, configure the first and second pairs of data contacts to enable exchange of data between the electronic device and the second electronic device over the first and second pairs of data contacts while keeping the third and fourth pairs of data contacts disabled.

7. The electronic device of claim 6 wherein the predetermined digital interconnect standard is a standard for audio and video data.

8. The electronic device of claim 6 wherein the predetermined digital interconnect standard is a DisplayPort standard.

9. The electronic device of claim 6 wherein the processor and circuitry is configured to disable the second row of contacts when the third and fourth pairs of data contacts are disabled.

* * * * *